US008558793B2

(12) United States Patent
Chen et al.

(10) Patent No.: US 8,558,793 B2
(45) Date of Patent: Oct. 15, 2013

(54) LOCUS SMOOTHING METHOD AND NAVIGATION DEVICE USING THE SAME

(75) Inventors: Hsin Chia Chen, Hsin-Chu (TW); Tzung Min Su, Hsin-Chu (TW); Tzu Yi Chao, Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 1083 days.

(21) Appl. No.: 12/549,197

(22) Filed: Aug. 27, 2009

(65) Prior Publication Data

US 2010/0103191 A1    Apr. 29, 2010

(30) Foreign Application Priority Data

Oct. 23, 2008   (TW) ............................... 97140587 A

(51) Int. Cl.
*G09G 5/08* (2006.01)
(52) U.S. Cl.
USPC ........................................ 345/163; 345/157
(58) Field of Classification Search
USPC ................. 345/156, 157, 163–166, 173, 179; 382/312, 317, 321; 715/856
See application file for complete search history.

(56) References Cited

U.S. PATENT DOCUMENTS

| 5,661,502 A | 8/1997 | Cheng |
| 7,212,685 B2 * | 5/2007 | Park et al ...................... 345/163 |
| 8,179,369 B2 * | 5/2012 | Kwak et al. ................... 345/166 |

* cited by examiner

*Primary Examiner* — Regina Liang
(74) *Attorney, Agent, or Firm* — Lowe, Hauptman & Ham

(57) ABSTRACT

A locus smoothing method processes a current estimated displacement according to a predetermined number of previous output smoothed displacements. The locus smoothing method includes the steps of: accumulating a predetermined number of previous output smoothed displacements to produce an accumulated displacement and recording a last output smoothed displacement; estimating a current estimated displacement; forming a digital filter according to the accumulated displacement, the last output smoothed displacement and the current estimated displacement; processing the current estimated displacement with the digital filter to produce a current smoothed displacement; and transmitting the current smoothed displacement to an image display. The present invention further provides a navigation device having smooth locus.

22 Claims, 4 Drawing Sheets

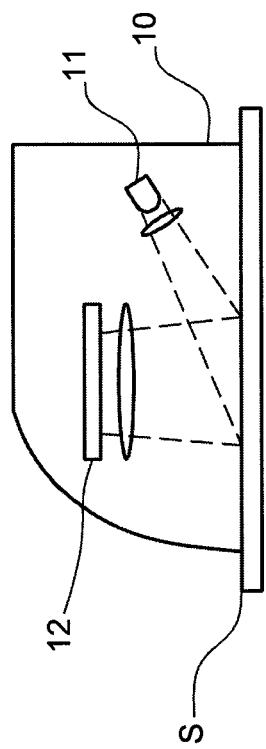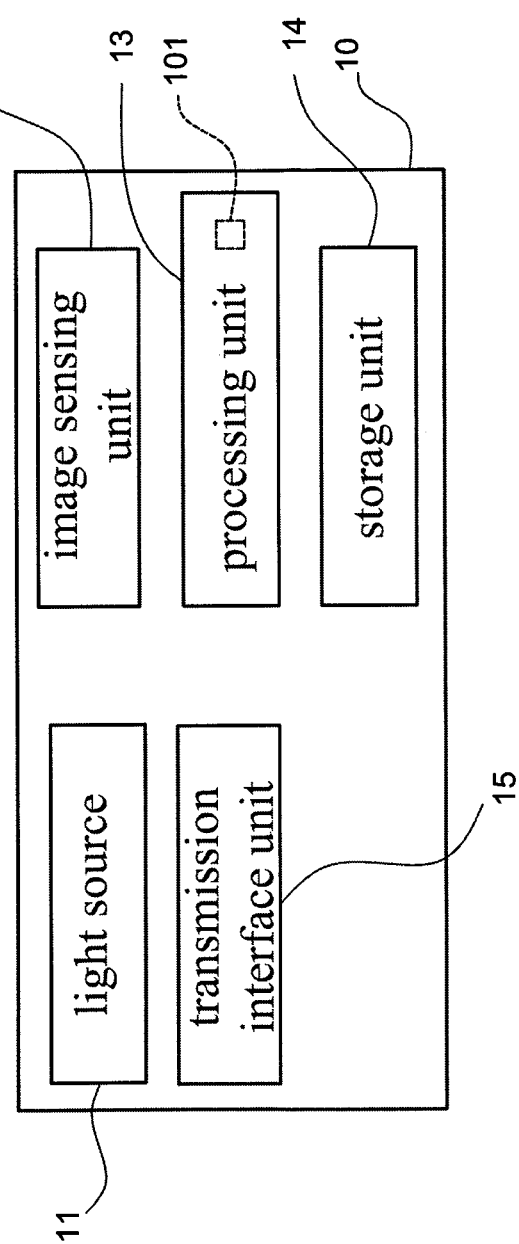

LOCUS SMOOTHING METHOD AND NAVIGATION DEVICE USING THE SAME

CROSS REFERENCE TO RELATED APPLICATION

This application claims the priority benefit of Taiwan Patent Application Serial Number 097140587, filed on Oct. 23, 2008, the full disclosure of which is incorporated herein by reference.

BACKGROUND

1. Field of the Invention

This invention generally relates to an image processing method and device and, more particularly, to a locus smoothing method and a navigation device using the same.

2. Description of the Related Art

Present interactive image systems have widely used a navigation device, such as a mouse or a pointing device, to estimate displacement, which will then be transmitted to an image display. In this manner, a user can manipulate the navigation device to correspondingly control the movement of a cursor or an aiming point shown on the image display. However, because the displacement estimated and output by the navigation device is a quantified value, if the quantified value is not processed by a smoothing process, the displacement output by the navigation device generally appears jagged appearance. When a user manipulates the navigation device to perform such as a drawing operation, it may not be easy to perform precise drawing that the user desires.

Therefore, the field of art provides locus smoothing methods in an attempt to solve aforementioned problem. For example, U.S. Pat. No. 5,661,502, entitled "Self-adjusting Digital Filter for Smoothing Computer Mouse Movement," provides a pointer movement smoothing method using a computer program. The method includes the steps of: determining current device coordinates of an input device; determining previous device coordinates of the pointer device; determining a value of an inertial constant; calculating corrected device coordinates using the current device coordinates, the previous device coordinates and the inertial constant; and outputting the corrected device coordinates to a display for displaying; wherein the value of the inertial constant is dependent upon a value of a constant indicative of a desired amount of speed sensitivity, the speed of movement of the input device, and a value of a constant indicative of a desired amount of filtering. In conclusion, the above method performs smoothing process based on current coordinates and previous corrected coordinates of the input device, so it has a limited smoothing effect. In addition, if it is desired to use the method to accumulate more previous information to obtain a better smoothing effect, a large memory space is required to record a variety of information, and thus a higher memory cost is unavoidable.

Accordingly, the present invention further provides a method and a navigation device using the same that performs locus smoothing according to an accumulation of a predetermined number of displacement information. A digital filter formed according to the locus smoothing method of the present invention has better smoothing effect and only needs to record the accumulation of previous displacement information. Since the accumulation of previous displacement information already includes all information of previous displacements, it is not necessary to spend large memory resources recording all displacement information separately and thus the system cost can be reduced.

SUMMARY

The present invention provides a locus smoothing method and a navigation device using the same that can improve the operatability of a navigation device by real-timely processing the displacement information estimated by the navigation device.

The present invention provides a locus smoothing method and a navigation device using the same, wherein since only an accumulation value of a predetermined number of previous output displacement information needs to be recorded rather than recording all displacement information separately, the memory requirement can be effectively decreased.

The present invention provides a locus smoothing method that processes a current estimated displacement according to a predetermined number of previous output smoothed displacements. The locus smoothing method includes the steps of: accumulating the predetermined number of previous output smoothed displacements to produce a first accumulated displacement and recording a last output smoothed displacement; estimating a current estimated displacement; subtracting the first accumulated displacement with the last output smoothed displacement and then adding the current estimated displacement thereto to produce a second accumulated displacement; dividing the second accumulated displacement by a predetermined positive integer to produce a current smoothed displacement; accumulating the current smoothed displacement into the first accumulated displacement and updating the last output smoothed displacement; and transmitting the current smoothed displacement to an image display.

According to another aspect of the present invention, there is provided a locus smoothing method that processes a current estimated displacement according to a predetermined number of previous output smoothed displacements. The locus smoothing method includes the steps of: accumulating the predetermined number of previous output smoothed displacements to produce an accumulated displacement and recording a last output smoothed displacement; estimating a current estimated displacement; forming a digital filter according to the accumulated displacement, the last output smoothed displacement and the current estimated displacement; processing the current estimated displacement with the digital filter to produce a current smoothed displacement; accumulating the current smoothed displacement into the accumulated displacement and updating the last output smoothed displacement; and transmitting the current smoothed displacement to an image display.

According to another aspect of the present invention, there is provided a navigation device that performs locus smoothing with a digital filter. The navigation device includes an image sensing unit, a processing unit, a storage unit and a transmission interface unit. The image sensing unit is for capturing images to produce a current digitized displacement. The processing unit forms the digital filter according to an accumulated displacement of a predetermined number of previous output smoothed displacements, a last output smoothed displacement and the current digitized displacement, and processes the current digitized displacement with the digital filter to produce a current smoothed displacement. The storage unit stores the accumulated displacement, the last output smoothed displacement and the current digitized displacement. The transmission interface unit transmits the current smoothed displacement to an image display.

The locus smoothing method and navigation device using the same uses the accumulated information of a predetermined number of previous output smoothed displacement as a basis for performing smoothing, and thus it has a better smoothing effect and lower memory requirement. The navigation device may be a mouse or a pointing device for controlling the movement of a cursor or an aiming point shown on an image display. In addition, the displacement according to one embodiment of the present invention includes a transverse displacement and a longitudinal displacement. In an alternative embodiment, the displacement in accordance with the present invention includes a distance variation and an angle variation.

BRIEF DESCRIPTION OF THE DRAWINGS

Other objects, advantages, and novel features of the present invention will become more apparent from the following detailed description when taken in conjunction with the accompanying drawings.

FIG. 2a shows a schematic diagram of the navigation device according to one embodiment of the present invention.

FIG. 2b shows a block diagram of the navigation device according to one embodiment of the present invention.

DETAILED DESCRIPTION OF THE EMBODIMENT

Figure 1:
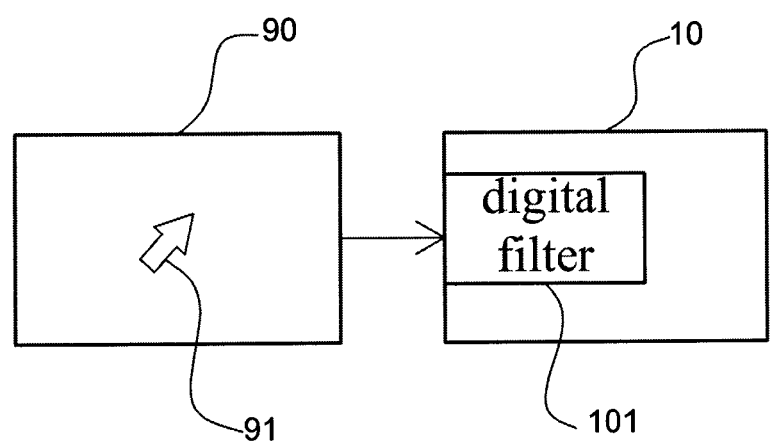
FIG. 1 shows a schematic diagram of an application of the navigation device in accordance with the embodiment of the present invention.

Please refer to FIG. 1, it shows a schematic diagram of an application of a navigation device 10 in accordance with the embodiment of the present invention including the navigation device 10 and an image display 90. It should be appreciated that FIG. 1 only shows elements for illustrating the present invention and omits others. Embodiments of the navigation device 10 include a mouse and a pointing device. The navigation device 10 is wirelessly or electrically coupled to the image display 90, such as, but not limited to, a television, a projection screen, a computer screen or a game machine screen, for correspondingly controlling the movement of a cursor or an aiming point 91 shown on the screen of the image display 90. In the present invention, the navigation device 10 is for capturing a plurality of images, obtaining a digitized displacement between captured images and processing the digitized displacement with a digital filter 101 (illustrated hereinafter) to produce a smoothed displacement, which will be transmitted to the image display 90. It will be recognized that, the image display 90 preferably includes a coordinate processing unit for combining the smoothed displacement to the coordinates of the cursor 91. In this manner, the cursor 91 can be moved smoothly on the screen of the image display 90 according to the smoothed displacement.

Please refer to FIGS. 2a and 2b, they respectively show a schematic diagram and a block diagram of the navigation device 10 according to one embodiment of the present invention. In this embodiment, the navigation device 10 is shown as a mouse disposed on a work surface "S", e.g. the surface of a table or the surface of a mouse pad, for being manipulated by a user (not shown). The navigation device 10 includes a light source 11, an image sensing unit 12, a processing unit 13, a storage unit 14 and a transmission interface unit 15, wherein the digital filter 101 may be disposed inside the processing unit 13.

Embodiments of the light source 11 include a light emitting diode and a laser diode, and the light source 11 is for providing necessary illumination during the image sensing unit 12 capturing images. Embodiments of the image sensing unit 12 include, but not limited to, a charge-coupled device (CCD) image sensor and a complementary-metal-oxide semiconductor (CMOS) image sensor, and the image sensing unit 12 is for capturing light reflected from the work surface "S" to produce digital images and for calculating a digitized displacement of the navigation device 10 with respect to the work surface "S". For example, but not limited to, the image sensing unit 12 calculates the digitized displacement according to the correlation between digital images, wherein the digitized displacement has not yet been processed by a smoothing procedure for the present stage. The processing unit 13 includes the digital filter 101, and the digitized displacement from the image sensing unit 12 will be filtered by the digital filter 101 (illustrated hereinafter) to become a smoothed displacement, which will then be stored in the storage unit 14. In addition, the processing unit 13 accumulates the smoothed displacements output from the digital filter 101 by giving a weighting to each smoothed displacement and the accumulated smoothed displacement will then be stored in the storage unit 14, wherein, for example, the later produced smoothed displacement may be given a larger weighting and the earlier produced smoothed displacement may be given a smaller weighting. In addition, the number of smoothed displacements to be accumulated may be determined according to actual requirements because different accumulation number will lead to different smoothing effect. The processing unit 13 may be integrated inside a mouse IC or may be formed as an individual unit separated from a mouse IC.

The transmission interface unit 15 transmits the current smoothed displacement output from the digital filter 101 to the image display 90. In addition, the navigation device 10 may further include at least one lens or a lens set disposed in front of the light source 11 and/or the image sensing unit 12 to adjust light paths. It will be recognized that, in other embodiment, for example, when the navigation device 10 is a pointing device rather than a mouse, the light source 11 can be omitted; in this case, the navigation device 10 can be manipulated by a user holding on his hands rather than disposing on the work surface "S".

Figure 3:
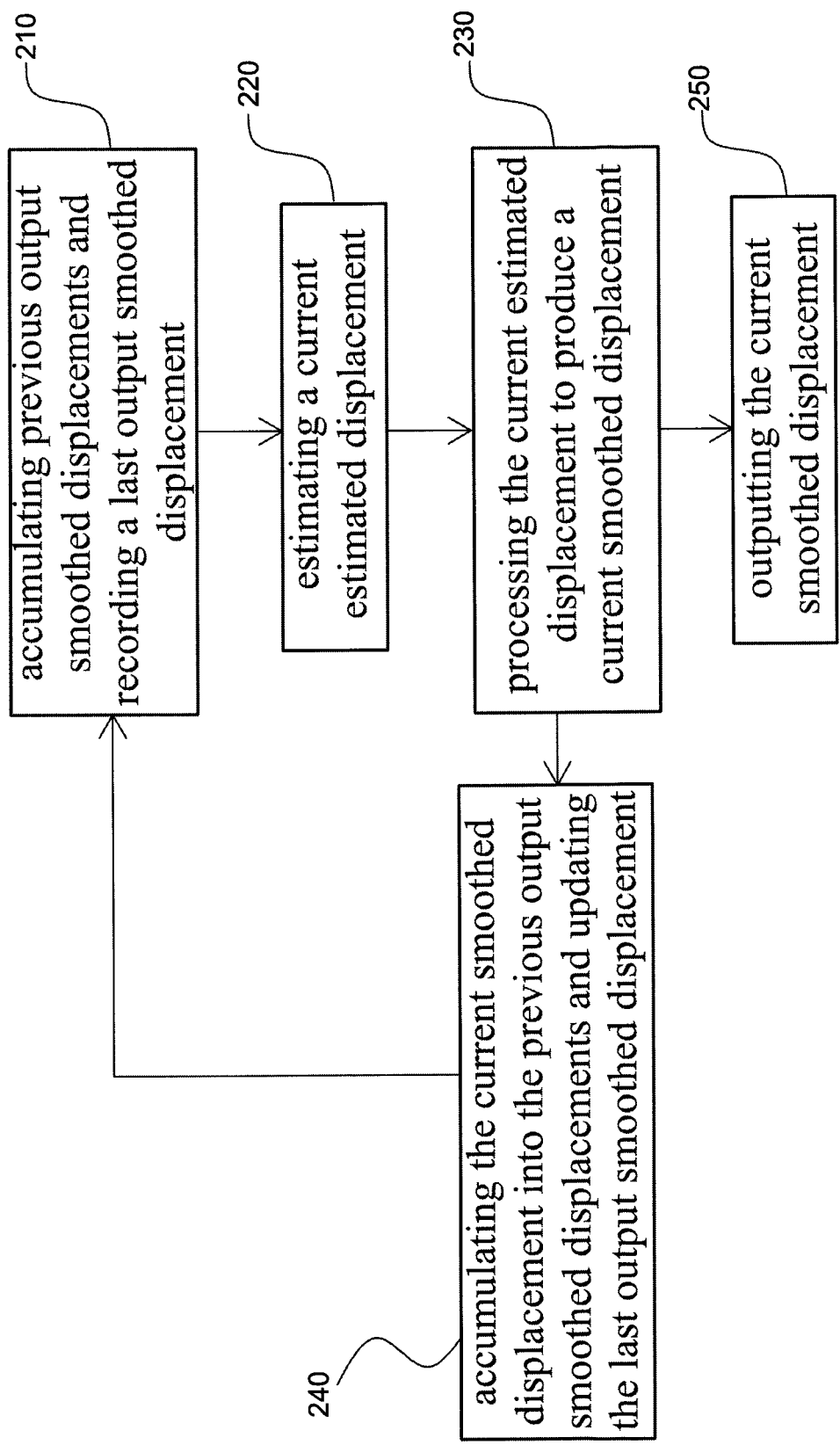
FIG. 3 shows a flow chart of the locus smoothing method according to one embodiment of the present invention.

Please refer to FIG. 3, it shows a flow chart of the locus smoothing method according to one embodiment of the present invention. The locus smoothing method includes the steps of: accumulating previous output smoothed displacements and recording a last output smoothed displacement (step 210); estimating a current estimated displacement (step 220); processing the current estimated displacement to produce a current smoothed displacement (step 230); accumulating the current smoothed displacement into the previous output smoothed displacements, and updating the last output smoothed displacement (step 240); and outputting the current smoothed displacement (step 250). Details of the locus smoothing method above will be illustrated hereinafter.

Please refer to FIGS. 1-3; the navigation device 10 transmits the output smoothed displacement to the image display 90 with a predetermined report rate, e.g. 125 Hz or 500 Hz. First, the processing unit 13 of the navigation device 10 accumulates a predetermined number of previous output smoothed displacements and records a last output smoothed displacement, and those displacements will then be stored in the storage unit 14, wherein when the navigation device 10 moves from still, the accumulated smoothed displacement and the last output smoothed displacement from the beginning are both 0 (step 210). Next, the navigation device 10 estimates a current estimated displacement, which is a digitized displacement and is not yet processed by a smoothing process (step 220), wherein the current estimated displacement can be estimated, for example, according to the correlation between captured images.

The current estimated displacement is then input to the digital filter 101 for smoothing, and the digital filter 101 is formed according to the following equations:

$$S[n]=S[n-1]-P[n-1]+D[n] \quad (1)$$

$$P[n]=S[n]/N \quad (2)$$

$$D'[n]=P[n] \quad (3)$$

where S[n−1] represents an accumulated displacement of a predetermined number of previous output smoothed displacements; P[n−1] represents a last output smoothed displacement; D[n] represents a current estimated displacement; and D'[n] is a current smoothed displacement obtained from the current estimated displacement processed by the digital filter 101. After rearranging equations (1) and (2), it can be derived that:

$$P[n]=((N-1)/N) \times P[n-1]+(1/N) \times D[n] \quad (4)$$

where "×" is a multiplication symbol. Transferring equation (4) with Z-transform, a transfer function of the digital filter 101 can be derived as:

$$H[z]=1/(N-(N-1) \times z^{-1}) \quad (5)$$

where N is a positive integer, and one embodiment of N is, but not limited to, 2. Therefore, when the current estimated displacement D[n] is input into the digital filter 101, a current smoothed displacement D'[n] can then be derived (step 230). At the same time, it can be understood from equations (1) and (3) that, the locus smoothing method in accordance with the present invention only needs to record an accumulation value of a predetermined number of previous output smoothed displacements S[n−1] and a last output smoothed displacement P[n−1] without the need of recording every output displacements, so the memory requirement can be effectively reduced. Furthermore, since the accumulation of the previous output smoothed displacements S[n−1] includes all information of a plurality of previous output displacements, the smoothing method of the present invention can provide better smoothing effect. It is appreciated that, the number of the previous output smoothed displacements to be accumulated can be determined according practical applications. In order to obtain better smoothing effect, the accumulation of the previous output smoothed displacements can be performed by giving different weightings to each output smoothed displacement.

Next, the current smoothed displacement D' [n] will be accumulated into the accumulated value of the predetermined number of previous output smoothed displacements, and the last output smoothed displacement will be updated with the current smoothed displacement D' [n] (step 240). Finally, the navigation device 10 outputs, through the transmission interface unit 15, the current smoothed displacement D' [n] to the image display 90 (step 250) for performing corresponding control.

Figure 4:
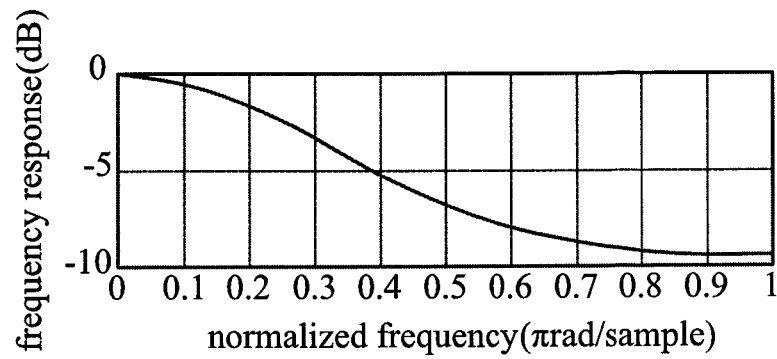
FIG. 4 shows the frequency response of the digital filter according to one embodiment of the present invention.

FIG. 4 shows the frequency response of the digital filter 101 that is obtained from the transfer function of equation (5), according to the embodiment of the present invention, wherein the longitudinal axis represents the frequency response and the transverse axis represents the normalized frequency. According to FIG. 4, it can be understood that the digital filter 101 of the present invention is a low-pass filter that can remove higher frequency components to obtain a smoothed displacement. In the present embodiment, lower frequency components are the digitized displacement having smaller values obtained by the images sensing unit 12, while higher frequency components are the digitized displacement having larger values. Because the digital filter 101 of the present invention includes the information of a plurality of previous output smoothed displacements, it can provide better smoothing effect.

Figure 5A:
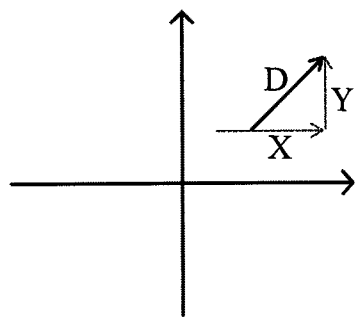
FIG. 5a shows a schematic diagram of a displacement in the locus smoothing method according to the embodiment of the present invention.
Figure 5B:
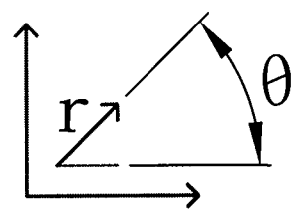
FIG. 5b shows another schematic diagram of a displacement in the locus smoothing method according to the embodiment of the present invention.

Please refer to FIGS. 5a and 5b, they respectively show an example of the displacement used in the locus smoothing method in accordance with the present invention. FIG. 5a shows a Cartesian coordinate system, and a displacement "D" herein includes a transverse displacement "X" and a longitudinal displacement "Y", i.e. equation (1) includes following two equations, $$S_X[n]=S_X[n-1]-P_X[n-1]+X[n] \quad (6)$$

$$S_Y[n]=S_Y[n-1]-P_Y[n-1]+Y[n] \quad (7)$$

similarly, equations (2) and (4), respectively, also include a transverse component and a longitudinal component, and details will not be repeated again herein. FIG. 5b shows a cylindrical coordinate system, and a displacement "D" herein includes a distance variation "r" and an angle variation "θ", i.e. equation (1) includes the following equations, $$S_r[n]=S_r[n-1]-P_r[n-1]+r[n] \quad (8)$$

$$S_\theta[n]=S_\theta[n-1]-P_\theta[n-1]+\theta[n] \quad (9)$$

similarly, equations (2) and (4), respectively, also include a distance component and an angle component, and details will not be repeated again herein.

As mentioned above, because the conventional locus smoothing method forms a digital filter using current estimated displacement information and last displacement information, it has worse smoothing effect and needs larger memory space to improve the smoothing effect. The present invention further provides a locus smoothing method (FIG. 3) that forms a digital filter based on a predetermined number of smoothed displacements and current estimated displacement information, so the method of the present invention has better smoothing effect and lower memory requirement. Additionally, the smoothing effect of the present invention can be fine tuned by changing the number of accumulated smoothed displacement information to obtain higher practicability.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A locus smoothing method for processing a current estimated displacement according to a predetermined number of previous output smoothed displacements, the locus smoothing method performed by a processing unit of a navigation device and comprising the steps of:
- accumulating the predetermined number of previous output smoothed displacements to produce a first accumulated displacement and recording a last output smoothed displacement;
- estimating the current estimated displacement;
- subtracting the first accumulated displacement with the last output smoothed displacement and then adding the current estimated displacement thereto to produce a second accumulated displacement; and
- dividing the second accumulated displacement by a positive integer to produce a current smoothed displacement.

2. The locus smoothing method as claimed in claim 1, wherein the first accumulated displacement, the second accumulated displacement, the current estimated displacement, the last output smoothed displacement and the current smoothed displacement comprise a transverse displacement and a longitudinal displacement.

3. The locus smoothing method as claimed in claim 1, wherein the first accumulated displacement, the second accumulated displacement, the current estimated displacement, the last output smoothed displacement and the current smoothed displacement comprise a distance variation and an angle variation.

4. The locus smoothing method as claimed in claim 1, wherein in the step of accumulating the predetermined number of previous output smoothed displacements, the predetermined number of previous output smoothed displacements are accumulated by giving a weighting to each previous output smoothed displacement.

5. The locus smoothing method as claimed in claim 4, wherein the latter output smoothed displacement is given a larger weighting.

6. The locus smoothing method as claimed in claim 1, further comprising the steps of:
- accumulating the current smoothed displacement into the first accumulated displacement; and
- updating the last output smoothed displacement.

7. The locus smoothing method as claimed in claim 1, further comprising the step of:
- transmitting the current smoothed displacement to an image display.

8. The locus smoothing method as claimed in claim 1, wherein the positive integer is 2.

9. A locus smoothing method, processing a current estimated displacement according to a predetermined number of previous output smoothed displacements, the locus smoothing method comprising:
- accumulating the predetermined number of previous output smoothed displacements to produce an accumulated displacement and recording a last output smoothed displacement;
- estimating a current estimated displacement;
- forming a digital filter according to the accumulated displacement, the last output smoothed displacement and the current estimated displacement; and
- processing the current estimated displacement with the digital filter to produce a current smoothed displacement.

10. The locus smoothing method as claimed in claim 9, wherein the accumulated displacement, the last output smoothed displacement, the current estimated displacement and the current smoothed displacement comprise a transverse displacement and a longitudinal displacement.

11. The locus smoothing method as claimed in claim 9, wherein the accumulated displacement, the last output smoothed displacement, the current estimated displacement and the current smoothed displacement comprise a distance variation and an angle variation.

12. The locus smoothing method as claimed in claim 9, wherein in the step of accumulating the predetermined number of previous output smoothed displacements, the predetermined number of previous output smoothed displacements are accumulated by giving a weighting to each previous output smoothed displacement.

13. The locus smoothing method as claimed in claim 12, wherein the latter output smoothed displacement is given a larger weighting.

14. The locus smoothing method as claimed in claim 9, further comprising the steps of:
- accumulating the current smoothed displacement into the accumulated displacement and
- updating the last output smoothed displacement.

15. The locus smoothing method as claimed in claim 1, further comprising the step of: transmitting the current smoothed displacement to an image display.

16. A navigation device, which performs locus smoothing with a digital filter, the navigation device comprising:
- an image sensing unit for capturing images to produce a current digitized displacement;
- a processing unit forming the digital filter according to an accumulated displacement of a predetermined number of previous output smoothed displacements, a last output smoothed displacement and the current digitized displacement, and processing the current digitized displacement with the digital filter to produce a current smoothed displacement; and
- a storage unit for storing the accumulated displacement, the last output smoothed displacement and the current digitized displacement.

17. The navigation device as claimed in claim 16, wherein the navigation device is a mouse or a pointing device.

18. The navigation device as claimed in claim 17, wherein when the navigation device is a mouse, the processing unit is integrated in a mouse IC.

19. The navigation device as claimed in claim 16, further comprising a transmission interface unit for transmitting the current smoothed displacement to an image display.

20. The navigation device as claimed in claim 16, wherein the current smoothed displacement is equal to a value, which is obtained by subtracting the accumulated displacement with the last output smoothed displacement and then adding the current digitized displacement thereto, divided by a positive integer.

21. The navigation device as claimed in claim 16, wherein the processing unit accumulates the predetermined number of previous output smoothed displacements by giving a weighting to each previous output smoothed displacement to produce the accumulated displacement.

22. The navigation device as claimed in claim 21, wherein the latter output smoothed displacement is given a larger weighting.

* * * * *